July 7, 1964                G. C. ABBOTT              3,139,638

NUT FEEDING AND ORIENTING MEANS AT WORK STATION

Original Filed Dec. 13, 1956                      5 Sheets-Sheet 1

Fig. 1

INVENTOR
GAIL C. ABBOTT

BY Strauch, Nolan & Neale
ATTORNEYS

July 7, 1964 G. C. ABBOTT 3,139,638
NUT FEEDING AND ORIENTING MEANS AT WORK STATION
Original Filed Dec. 13, 1956 5 Sheets-Sheet 5

INVENTOR
GAIL C. ABBOTT
BY Strauch, Nolan & Neale
ATTORNEYS

United States Patent Office 3,139,638
Patented July 7, 1964

3,139,638
NUT FEEDING AND ORIENTING MEANS AT WORK STATION
Gail C. Abbott, % Grip Nut Co., South Whitley, Ind.
Original application Dec. 13, 1956, Ser. No. 628,040, now Patent No. 3,084,359, dated Apr. 9, 1963. Divided and this application Apr. 3, 1962, Ser. No. 189,949
4 Claims. (Cl. 10—162)

The present invention relates to improvements in automatic machine tools and more particularly to improvements in lock nut forming machines. This is a division of co-pending application Serial No. 628,040 filed December 13, 1956 for Machine Tool now U.S. Patent No. 3,084,359.

Examples of prior art lock nut forming devices may be found in United States Letters Patent No. 2,686,546, issued August 17, 1954 to J. A. MacLean, Jr. and 2,754,871 issued July 17, 1956 to A. Stoll.

It is a primary general object of this invention to provide an improved machine tool for automatically feeding a series of interchangeable work pieces to and accurately positioning such work pieces at a work station and embodying a tool at said work station adapted to act upon the work pieces in timed relation to their movement through the work station.

It is a further object of the present invention to provide a machine for rapidly converting preformed internally threaded nuts into lock nuts by simultaneously distorting discrete portions of the nut threads at symmetrically spaced positions about the nut axes.

A further object of the present invention is to provide a machine embodying a plurality of indenting dies mounted for converging and diverging movement in a common plane in equi-angularly spaced relation relative to a common point in that plane and a nut feed mechanism for sequentially positioning nuts at and removing them from the center of focus of the paths of die movement in timed relation with the simultaneous like movement of the dies.

A further object of the present invention is to provide a nut side indenting machine which may be readily and rapidly converted from accommodating nuts of any given size to accommodate nuts of any other given size distinct from the first nut size and converted to produce various types of side indentations for different types of lock nuts.

A further object of the present invention is to provide indenting die assembly comprising a hard metal spherical indention die and a holder therefor in which the die can be readily and rapidly replaced.

A further object of the present invention is to provide an indenting die assembly embodying an indenting die and a stop-off shoulder disposed in surrounding relation to the working surface of the indenting die and having a face adapted to engage the side face of a nut being indented to establish the limit of inward indenting movement of the die into a nut side face.

A further object of the present invention is to provide an improved device for rapidly feeding a plurality of work pieces seriatim to a work station and accurately angularly orienting each article at the work station.

A further object of the present invention is to provide an improved machine in which a work piece is accurately positioned relative to a predetermined plane and accurately angularly oriented about an axis normal to such plane without material lateral restraint parallel to the plane and in which a plurality of tools symmetrically disposed about the work piece impart simultaneously exerted counter-balancing thrust forces upon a so-positioned work piece in a direction parallel to the plane so that the thrust forces are absorbed entirely by the work piece.

These and other objects of the present invention will become more fully apparent by reference to the appended claims as the following detailed description proceeds the reference to the accompanying drawings wherein:

The machine of the present invention is primarily intended for use in forming lock nuts of the type disclosed in United States application Serial No. 603,921 filed August 14, 1956 by Gail C. Abbott for Self Locking Nuts but may be used in forming any side indented nut such as those disclosed in the aforesaid MacLean & Stoll patents or for other purposes as will become apparent presently. The specific disclosed embodiment utilizing three indenting die assemblies is adapted to indent alternate ones of the side faces of hexagonal nuts.

Figure 1:
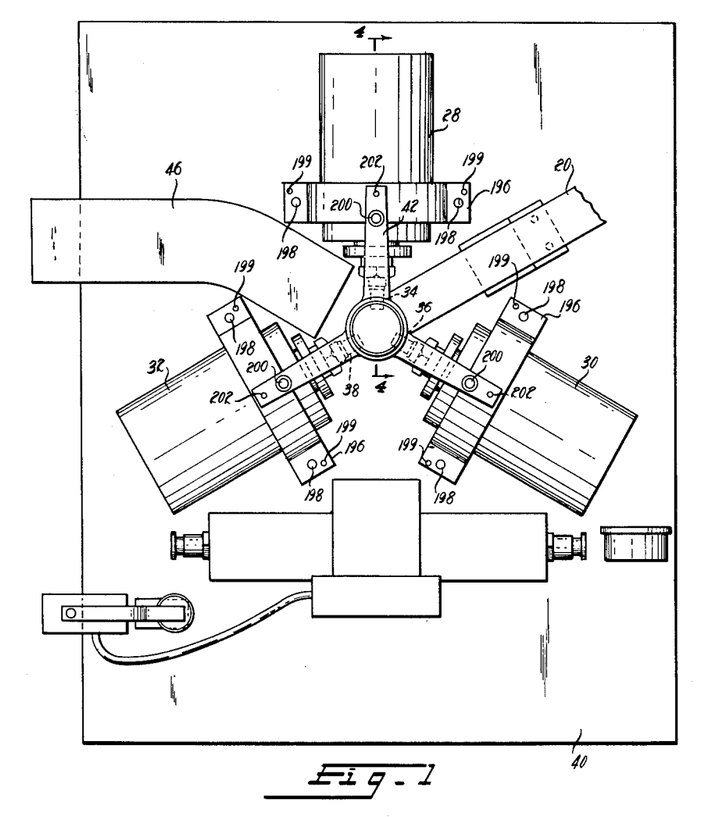
FIGURE 1 is a top plan view of the machine tool of the present invention.
Figure 2:
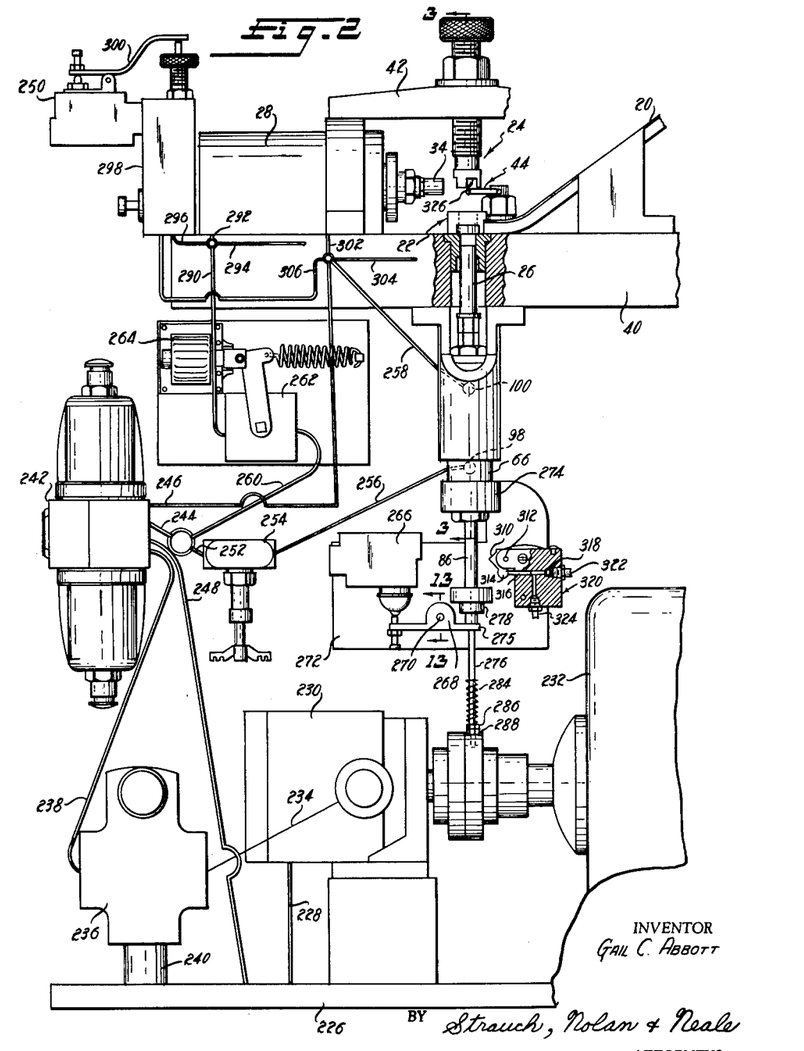
FIGURE 2 is a diagrammatic illustration of the machine tool of the present invention and the hydraulic fluid circuitry controlling its actuation.

Referring now to the drawings and particularly to FIGURES 1 and 2, the machine of the present invention comprises a downwardly inclined chute 20 through which nuts are fed by gravity in a single line laterally from a hopper (not shown) to a nut receiving station 22, a work station 24 located directly above the receiving station 22 and to which each nut is transferred in order from the receiving station 22 by a vertically reciprocable pusher or shuttle 26, a plurality of fluid motors 28, 30 and 32 equiangularly spaced about the work station, the movable element of each of which mounts one of the three indenting tools 34, 36 and 38 respectively. Motors 28, 30 and 32 are rigidly mounted upon the top surface of a bolster plate 40 and rigidly interconnected at their tops by a spider 42. An air powered nut ejecting device 44 is located adjacent the work station 24 to eject each finished nut into a nut receiving chute 46.

Figures 3, 5, 6, 8, 9:
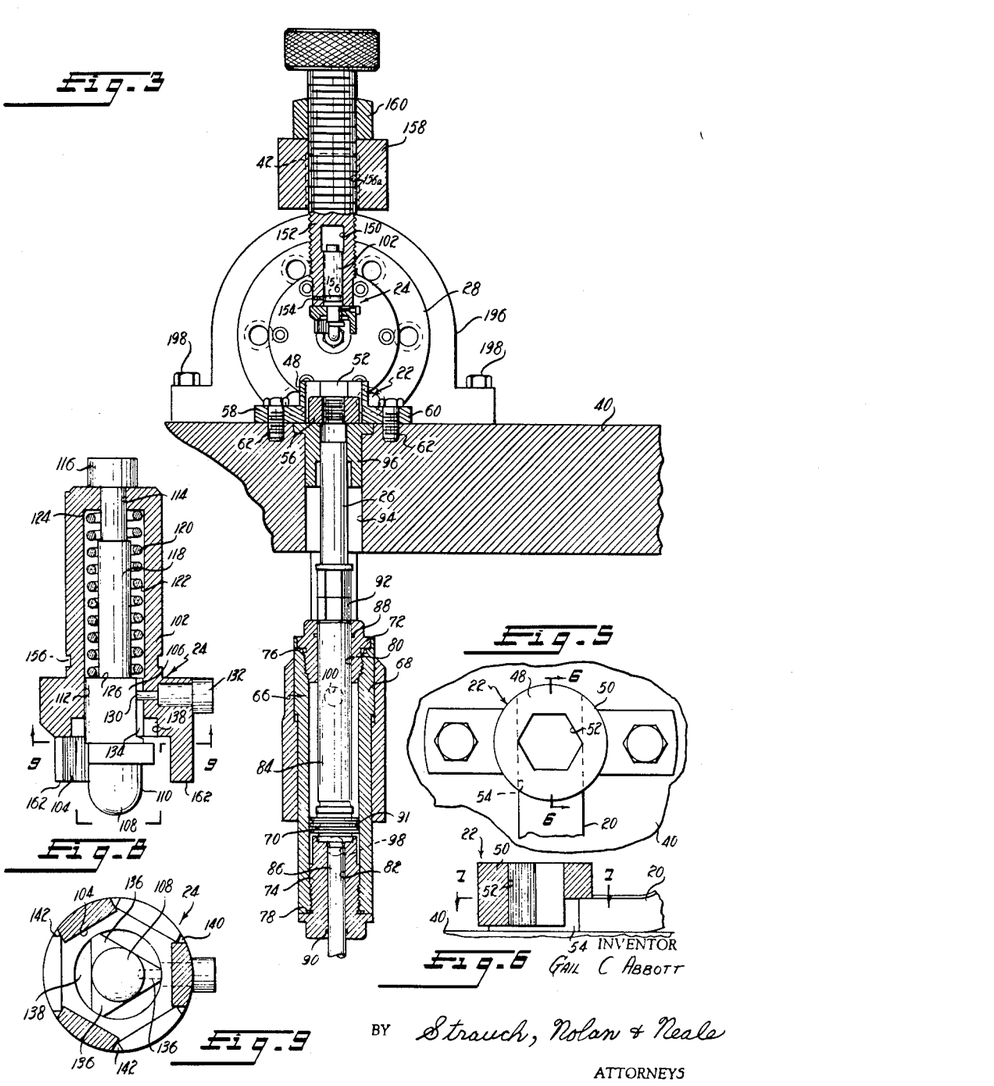
FIGURE 3 is a vertical sectional view of the nut feeding mechanism taken substantially along the line 3—3 of FIGURE 2.
FIGURE 5 is a top plan view of the starter bushing of the nut feding mechanism.
FIGURE 6 is a sectional view taken substantially along the line 6—6 of FIGURE 5.
FIGURE 8 is a vertical sectional view through the nut indexing fixture and pilot.
FIGURE 9 is a sectional view taken substantially along the line 9—9 of FIGURE 8.
Figures 7, 10, 11:
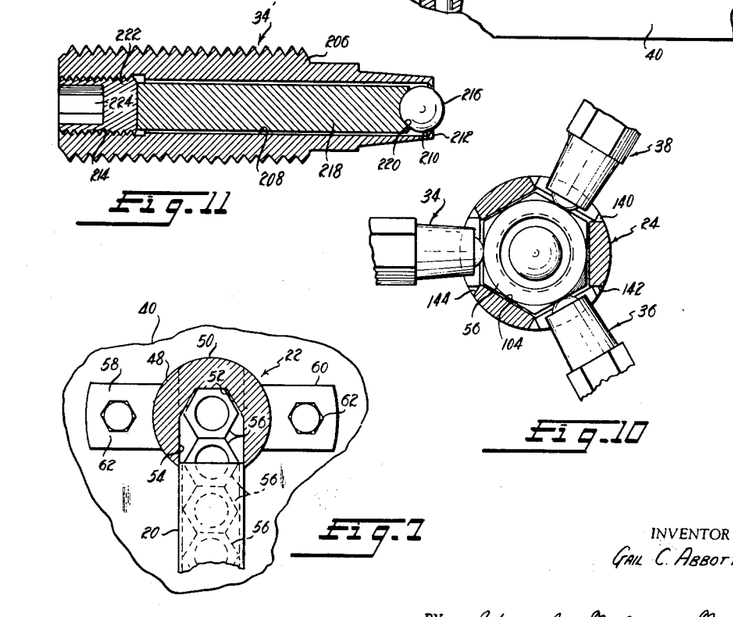
FIGURE 7 is a sectional view taken substantially along the line 7—7 of FIGURE 6.
FIGURE 10 is a view taken substantially along the line 10—10 of FIGURE 4 illustrating the relationship of a nut received in the indexing fixture to the indenting dies immediately prior to the initiation of nut indentation.
FIGURE 11 is a longitudinal sectional view of one of the indenting die assemblies.

As is most clearly apparent from FIGURES 5, 6 and 7, the nut receiving station is defined by a starter bushing 48 which is formed with a central boss 50 having a through opening 52 of polygonal cross section (hexagonal for hexagonal nuts, square for square nuts etc.) and a side opening recess 54 through which the nuts 56 are fed laterally seriatim to a position in alignment with the through opening 52 from the chute 20 over the top surface of the bolster plate 40. The starter bushing 48 is formed with laterally extending attachment lugs 58 and 60 and is secured to the bolster plate by bolts 62 passing through apertures in the lugs 58 and 60 and threadedly received in aligned threaded apertures in the bolster plate 40 as is most clearly shown in FIGURE 3. The starter bushing 48 establishes the initial alignment of each nut received through the chute 20 prior to the transfer of the nut to the work station 24. The side to side dimensions of the through aperture 52 are slightly greater than the maximum across face dimension of the size of nut being indented. For example, the side to side dimension of aperture 52 for a three quarter inch across flats nut is .782 inch and for a one half across flats nut, .532 inch. The vertical height of the side opening recess 54 also varies with the nut size: .465 inch for a ¾″ nut and .273 for a ½″ nut for example. The starter bushing 48 is readily detachable and replaceable by a similar starting bushing having a side recess 54 and through aperture 52 of suitable dimensions to accommodate nuts of other sizes.

The mechanism for transferring each nut 56 from the receiving station 22 to the work station 24 consists of a shuttle or pusher 26 which is actuated by a piston type fluid motor 66. Fluid motor 66 comprises a cylinder 68, a piston 70 mounted for longitudinal vertical sliding movement within the cylinder 68, upper and lower cylinder end plates or cups 72 and 74 which are threadedly received and fixed within the ends of the cylinder 68 and rendered fluid tight therewith by annular sealing elements 76 and 78 respectively and which are apertured at 80 and 82 respectively to slidably receive the upper and lower piston rods 84 and 86 integral with piston 70, fluid tight relationship between the piston rod 84 and the end plate 72 being maintained by a fluid seal 88, fluid tight relationship being the piston rod 86 and the end plate 74 being maintained by an annular seal 90, and fluid tight relation between the piston 70 and wall of cylinder 68 being maintained by piston rings 91. The pusher 26 is threaded upon the upper end of the upper piston rod 84 and fixed thereto in abutment with the polygonal end portion 92 of rod 84. The fluid motor 66 and the pusher 26 are located substantially in coaxial alignment with the aperture 52 in the starter bushing 48, the upper end of the pusher extending through a through aperture 94 formed through the bolster plate 40 and being guided at its upper end for vertical sliding movement by a shuttle bushing 96 recessed in the top surface of bolster plate 40 so that the top surface of bushing 96 is flush with the top surface of the bolster plate 40. In order to impart upward movement to the piston 70 and pusher 26, motive fluid is introduced through the port 98 of the cylinder 68 and exhausted through the port 100 on the opposite side of the piston 70. When it is desired to lower the pusher 26, motive fluid is introduced through the port 100 and exhausted through the port 98. The pusher 26 is larger in cross section than the minor diameter of the nuts with which it is used so that, as the pusher 26 is lifted, its upper end face abuts the bottom surface of a nut 56 around the threaded bore thereof and lifts the nut 56 vertically to the work station 24. For a ½″ nut, the diameter of the shank of pusher 26 is .437″; for a ¾″ nut, .687 for example. The diameter of the bore of bushing 96 is dimensioned to accommodate the pusher 26 with a free sliding fit, .442″ for a ½″ nut, .692 for a ¾″ nut.

Referring to FIGURES 8, 9 and 10, the work station 24 comprises a nut indexing fixture 102 having a downwardly opening polygonal recess 104 of similar cross section and aligned with the polygonal through aperture 52 of the starter bushing 48 at the receiving station 22 to receive a nut 56 lifted by the pusher 26 from the receiving station 22 to the work station 24 in a position as shown in FIGURE 10. The side to side dimensions of recess 104 vary with the size nut being indented, .750 for a ¾″ nut and .495″ for a ½″ nut, for example. The work station 24 further comprises a centrally located pilot 106 having a hemispherical end surface 108 merging into a cylindrical piloting portion 110, the diameter of which is so dimensioned as to be received into the threaded bore of each nut 56 as it is lifted into the work station 24 to establish accurate coaxial alignment of the nut 56 at the work station 24, .245″ for a ½″ nut and .400″ for a ¾″ nut. Pilot 106 is mounted for limited vertical sliding movement relative to the indexing fixture 102 by the guide surfaces 112 and 114 and is resiliently biased toward a downward limit position established by the coaction between the head of a stop screw 116 threadedly received in the upper end of the shank 118 of the pilot 106. The downward biasing force on pilot 106 is exerted by a compressed coil spring 120 received within the central bore 122 of the fixture 102 in surrounding relation to the shank 118 of the pilot 106 and compressed between the end surface 124 of bore 122 and the annular shoulder 126 on pilot 106. The pilot 106 is mounted for limited free vertical movement in opposition to the biasing force of spring 120, but is restrained against rotation by the coaction between the stem 130 of a screw 132 and a longitudinally extending slot 134 in the exterior surface of the pilot 106. Three equiangularly spaced radially projecting lugs 136 are formed on the pilot 106 at the upper end of the cylindrical portion 110. Lugs 136 are dimensioned to be received within a cylindrical recess 138 formed in the end wall of bottom opening recess 104. The lugs 136 abut the end wall of the recess 138 to establish the upper limit position of the pilot 106.

The bottom opening recess 104 is formed with equiangularly spaced side openings 140, 142 and 144 formed by the removal of alternate ones of the side faces of the nut 56. Openings 140, 142 and 144 are tool entry openings through which the ends of the indenting tools 38, 36 and 34 respectively pass to engage the aligned side faces of the nut 56 when in work station 24 as illustrated in FIGURE 10.

When a nut 56 is lifted by the pusher 26 the end 108, 110 of the pilot 106 passes into the threaded bore of the nut 56 to establish accurately its coaxial alignment and, when the upper end face of the nut 56 abuts the projections 136, the pilot 106 is forced upwardly in opposition to the biasing force of the spring 120 until the nut 56 is fully received in the recess 104. As is apparent from the foregoing given dimensions for the recess 104 and openings 52, the side to side dimension of recess 104 more closely approximates the maximum in tolerance dimension for nuts of the nominal size it is designed to receive than the corresponding dimension of opening 52 for the same size nut. This establishes a more accurate angular orientation of the nut in the indexing fixture 102 than in the starting bushing 48. This, as is most clearly shown in FIGURE 10, permits slight lateral play of the nut 56 except for those having exactly the maximum across flat in tolerance dimensions. When acted upon simultaneously by the three indenting tools 34, 36 and 38 the nut is self centered and absorbs the entire force exerted by the tools 34, 36 and 38 without transmission of any material portion of that force to the indenting fixture 102 or the pilot 106.

Referring to FIGURE 3, the indexing fixture 102 is received in the end bore 150 in a supporting screw 152, being retained therein by a set screw 154 engaging annular groove 156 formed in the periphery thereof. The supporting screw 152 is threaded through the threaded hole 156a through the centrally located boss 158 in the spider 42 and is fixed in its adjusted position thereon by a lock nut 160. The vertical position of the screw 152 establishes the vertical location of the work station 24. The engagement of the set screw 154 with the annular groove 156 permits rotation of the indexing fixture 102 relative to the screw 152 to establish the desired angular orientation thereof relative to the starter bushing 48 to receive nuts 56 after the vertical position of the screw 152 has been established. The set screw 154 is then tightened to fix the angular orientation of the indexing fixture 102.

Figure 4:
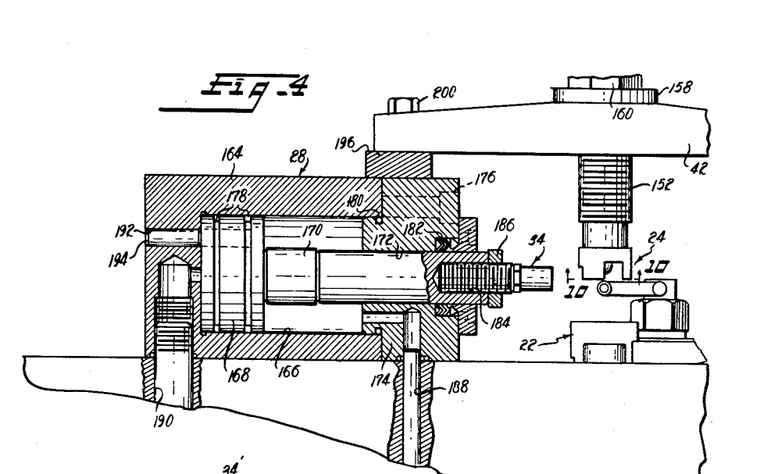
FIGURE 4 is a vertical sectional view taken substantially along the line 4—4 of FIGURE 1.

Each of the fluid motor 28, 30 and 32 is identical and identically mounted, the detailed construction of motor 28 being illustrated in FIGURE 4. Fluid motor 28 comprises a member 164 having a cylindrical bore 166 forming the cylinder in which is slidably received a piston 168 having an integral piston rod 170 projecting from the end thereof adjacent the work station 24 through an aligned aperture 172 in an end plate 174 fixed to the member 164 by suitably spaced screws 176. Fluid tight relation between the piston 168 and the cylinder wall 166 is maintained by piston rings 178, between member 164 and member 174 by annular sealing element 180 and between the piston rod 170 and the member 174 by a stuffing box 182. The indenting tool 34 is received in a threaded end bore 184 in the end of piston rod 170 and is fixed in axial adjusted position relative to piston rod 170 by a lock nut 186. Fluid is introduced into cylinder 166 on the piston rod side of piston 168 through a fluid conduit 188 passing through bolster plate 40 and the member 174, and fluid is introduced into cylinder 166 on the opposite side of piston 168 through a fluid conduit 188 passing through bolster plate 40 and the member 174 and fluid is introduced into cylinder 166 on the opposite side of piston 168 through a conduit 190 extending through bolster plate 40 and the member 164 as shown. An access opening 190 is sealed by an oil tight fitting dowel 194. The fluid motor 28 is fixed to the bolster plate 40 by a clamping yoke 196 which, as is best illustrated in FIGURE 3, surrounds the members 174 and 164 at their abutting portions and is fixed to the bolster plate 40 by screws 198 and by dowels 199 (FIGURE 1). Each of the three yokes 196 for the three fluid motors 28, 30 and 32 is rigidly fixed to the spider 42 by screws 200 and dowels 202. The axes of the piston rods 170 of each of the motors 28, 30 and 32 lie in a common plane parallel to the top surface of the bolster plate 40 and intersect the axes of the indexing fixture 152 at a common point in that plane, the axes of the indexing fixture 102 being normal to the plane defined by the axes of the piston rods 170 as is the path of movement of the nut 56 in its movement from the receiving station 22 to the work station 24.

The indenting tool assembly 34 may take the form of a deflector punch as is illuustrated in FIGURE 4 but preferably is of the form 34' illustrated in FIGURE 11 which comprises an externally threaded body member 206 of elongate construction having an internal through bore 208 terminating at one end in an inwardly turned annular lip 210 and a planar end face 212 normal to the axis of the member 206 and at the other end in an internally threaded counterbore 214. A hard metal spherical ball, constituting an indenting tool 216, of smaller diameter than the diameter bore 208 and of greater diameter than the aperture defined by the lip 210 is received within the bore 208, having a portion thereof projecting beyond the planar surface 212 and is retained in this position by a retainer member 218 received within the bore 208. Retainer member 218 is formed with a segmental spherical seating surface 220 to provide a seat for the indenting tool 216 and is of slightly lesser diameter in cross section than the diameter of the bore 208. This permits slight lateral movement of member 218 within the bore 208 to permit proper seating of the tool 216 relative to the lip 210 and the seat 220. Leftward movement of the retainer member 218 within the member 206 as viewed in FIGURE 11 is prevented by a plug 222 threaded into the counterbore 214 in abutment with the end of retainer member 218 opposite the seat 220. Plug 222 is formed with a non-circular tool receiving socket 224 to facilitate its removal and insertion.

The surface 212 forms a stop limiting the penetration of the indenting tool 216 into the side face of a nut 56. That is, the indenting tool assembly 34 will be moved forward by the fluid motor 28 to effect penetration of the projecting portion of the die 216 into the aligned side face of the nut 56 until the surface 212 abuts that side face of the nut 56. At that time further penetrating movement of the indenting tool 216 will terminate and the indenting tool assembly 34 will be restored to its inoperative position as shown in FIGURE 4. This operation will be explained in greater detail presently.

With the foregoing described details of construction in mind the operation of the machine tool of the present invention will become fully apparent by reference to the diagrammatic showing of FIGURE 2. The entire system is operative in timed relation to lift each nut from the receiving station to the work station, indent it and eject it. The system is powered primarily by hydraulic fluid under pressure which is available from the reservoir 226. Hydraulic fluid is drawn from reservoir 226 through a conduit 228 to a pump 230 which is driven by an electrical motor 232. Fluid under pressure from pump 230 is transmitted by a conduit 234 to a pressure relief valve 236 which controls the supply of fluid to a conduit 238 at a constant pressure, returning the excess hydraulic fluid via a conduit 240 to the reservoir 226. The conduit 238 is the supply conduit to a four-way solenoid operated control valve 242. In one setting of valve 242, it connects conduit 238 to conduit 244 and simultaneously connects conduit 246 to conduit 248 which is a return conduit from valve 242 to a reservoir 226. This setting is the setting of valve 242 during the time a nut is transferred from the receiving station 22 to the work station 224 and indented by the indenting tools 34, 36 and 38. The second position of solenoid valve 242 connects conduit 244 to return conduit 248 and supply conduit 238 to conduit 246. This is the setting of valve 242 which is effective to restore the pusher 26 to its lower position and the indenting tools 34, 36 and 38 to their inoperative positions. Solenoid valve 242 is controlled electrically by a switch 250 the actuation of which will be described presently.

With the valve 242 in its first described position in which conduit 238 is connected to conduit 244, hydraulic fluid under pressure is supplied via conduit 252, manual throttle valve 254 and conduit 256 to the inlet port 98 of the cylinder 66 and the port 100 of cylinder 66 is connected via conduit 258, conduit 248, valve 242 and conduit 248 to the reservoir 226. This effects upward movement of the piston 70 (FIGURE 3) to transfer a nut from the receiving station 22 to the work station 24 and to support the nut in the work station during indentation. At the same time, hydraulic fluid under pressure is supplied by conduits 254 and 260 to a main cylinder shut off valve 262 which is controlled by a solenoid 264 and which is in its closed position during upward movement of the pusher 26.

Figure 13:
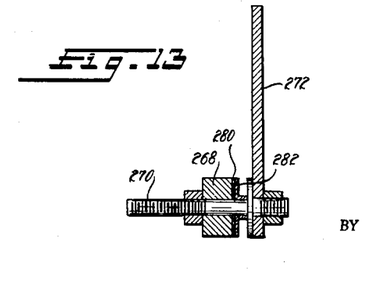
FIGURE 13 is a fragmentary sectional view taken substantially along the line 13—13 of FIGURE 2.

Solenoid 264 is controlled by an electrical switch 266 which is actuated by a rocker arm 268 pivoted at 270 upon a plate 272 fixed by a collar 274 to the lower end of the cylinder 66. Rocker arm 268 is formed at one end with an aperture through which a rod 276, coaxially fixed to the end of the piston rod 86, projects. A collar 278 is fixed to piston rod 86 above the arm 275 of rocker arm 268 and abuts the top of arm 275 when the piston 70 of cylinder 66 is in its lowermost position to pivot rocker arm 268 in a clockwise direction to actuate switch 266 to so control the energization of solenoid 264 as to maintain valve 262 in its closed position. The rocker arm 268 is mounted on pivot 270 and is friction held by friction washers 280 and 282 (FIGURE 13) in any pivoted position in which it is set, so that when collar 278 strikes the arm 275 of rocker arm 268 to pivot it in a clockwise direction, rocker arm 268 will remain in that position after piston rod 86 and piston 70 start their upward travel.

Mounted on the lower end of the rod 276 is a coil spring 284, an adjusting nut 286 and a lock nut 288. The nuts 286 and 288 are adjusted along the rod 276 to determine the upper position of the upper end of the spring 284.

Figure 12:
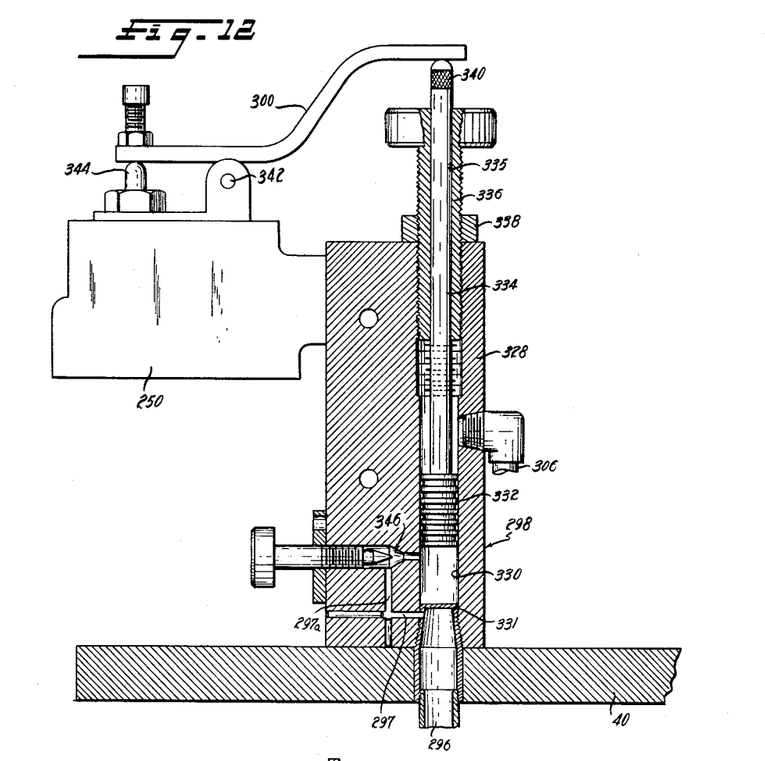
FIGURE 12 is a vertical section view through the pressure electric switch assembly.

When the piston 70 approaches the upper limit of its travel within the cylinder 68 to position a nut at the work station 24, the upper end of spring 284 abuts the lower face of the arm 275 of rocker arm 268 to pivot rocker arm 268 in a counterclockwise direction to reverse the setting of switch 266. The reversal of switch 266 controls the operation of solenoid 264 to open the main cylinder shut-off valve 262 which permits fluid to pass through conduit 260, valve 262, and conduits 290, 292 and 294 to each of the fluid motors 28, 30 and 32 via their inlet ports 190 (FIGURE 4) to impart work piece engaging movements simultaneously and equally to all of the indenting tools 34, 36 and 38. The conduit 290 is also connected by a conduit 296 to a pressure responsive device 298, the detailed construction of which is shown in FIGURE 12.

The pressure responsive device 298 controls the operation of the switch 250 which, it will be recalled, controls the actuation of the solenoid valve 242. When the indenting tools 34, 36 and 38 are advanced to a position in which the indenting tools 216 thereof have penetrated the side faces of the nut 56 and the stop-off face 212 (FIGURE 11) of each of the tool assemblies 34, 36 and 38 abuts the associated side face of the nut 56, there arises suddenly a higher resistance to further inward movement of the tool assemblies 34, 36 and 38. This is reflected by a sudden increase in pressure within the fluid motors 28, 30 and 32 and, via the conduit 296, passages 297 and 297a and orifice 346 (FIGURE 12) in the pressure responsive device 298 a controlled increase in pressure in device 298. This increase in pressure is effective to impart a counterclockwise pivotal movement of rocker arm 300 to reverse the setting of switch 250 to change the operative setting of the valve 242 to its second above described setting. In its reversed position as has been described, fluid pressure from conduit 238 is applied through conduit 246 and conduit 258 to the inlet port 100 of cylinder 66 to impart downward movement to the pusher 26 and simultaneously via conduit 302 and 304 to impart fluid pressure to the fluid motors 28, 30 and 32 via their inlet ports 188 (FIGURE 4) to restore the indenting tool assemblies 34, 36 and 38 to their inoperative position. This fluid pressure is also applied via conduit 306 to the fluid pressure responsive device 298 but, until pistons 168 and 70 reach their restored positions, is ineffective to restore it to its initial position. Fluid is exhausted from the fluid motors 28, 30 and 32 via the conduits 292 and 294, conduit 290, solenoid operative valve 262, conduits 260 and 244, valve 242 and conduit 248 to the reservoir 226. Fluid is exhausted from a fluid motor 66 via conduit 266, throttle valve 254, conduits 252 and 244, valve 242 and conduit 248 to the reservoir 226.

During the upward travel of collar 278 with piston rod 86, it pivots a rocker arm 310 pivoted on a shaft 312 in clockwise direction. This movement performs no useful function. During its downward movement, however, collar 278 again engages rocker arm 310 and imparts a slight counterclockwise movement to it about the shaft 312. Rocker arm 310 is formed at its lower side with an ear 314 which is in abutting contact with a pusher rod 316 controlling the operation of a ball valve 318 of an air valve assembly 320. The counterclockwise movement of rocker arm 310 during downward movement of the collar 278 shifts push rod 316 to the right as viewed in FIGURE 2 to unseat the ball valve 318 to admit compressed air via conduit 322 and outlet conduit 324 to supply compressed air to the compressed air ejector assembly 44. This produces a momentary jet of air via outlet nozzle 326 which acts upon the completely formed lock nut as it is lowered by the pusher 26 and the pilot 106 under the action of spring 120, from the recess 104 of the indexing fixture 102. Once the completely formed lock nut is clear of the indexing fixture 102, this jet of air pushes it off of the top of the pusher 26 and drives it into the inlet end of the chute 46 (FIGURE 1).

Once the collar 278 is passed the rocker arm 310, it and the push rod 316 are restored to their normal position, as shown in FIGURE 2, by the action of a spring (not shown) acting upon the ball valve 318.

When the collar 278 reaches its lower limit position, it abuts arm 275 of rocker arm 268 to restore the switch 266 to its initially described position in which solenoid 264 is effective to close main cylinder shut off valve 262 to restore the system to its initial condition to initiate the above described cycle again. The pressure responsive device 298 having been restored to its initial position in which switch 250 so controls valve 242 that pressure is applied from conduit 238 to conduit 248 and conduit 246 is connected to return line 248 by the increase in pressure via conduit 306 as the pistons of cylinders 28, 30 and 32 and 66 reach their limit positions.

Referring to FIGURE 12, the pressure responsive device 298 comprises a body member 328 formed with a through bore 330 into the lower end of which is received a closed end bushing 331 into which opens the conduit 296 and into the middle of which opens the conduit 306. A piston 332 is mounted within the bore 330 for vertical sliding movement between the inlet openings for conduits 296 and 306. Piston 332 is equipped with a piston rod 334 which is slidably guided in the through bore 335 of an adjusting screw 336 which is threaded into the upper end of bore 330 and which may be vertically adjusted therein to establish the upper limit position of the piston 332, the adjusted position of screw 336 being fixed by a lock nut 338. The upper end of the piston rod 334 projecting beyond the top of screw 336 is equipped with a hard metal button 340 adapted to abut the rocker arm 300 to effect its pivotal movement. Rocker arm 300 is pivoted at 342 and cooperates with a push button 344 of the switch 250 to control its set position. Button 344 is spring biased upwardly to oppose counterclockwise movement of rocker arm 300 and is effective to restore rocker arm 300 to its clockwise position as the piston rod 334 is lowered. When an increase in pressure occurs in conduit 296, as described above, fluid flow through bushing 331, passage 297, passage 297a, and adjustable metering orifice 346 to exert pressure on the lower face of piston 332 to shift it upwardly, fluid above piston 332 being exhausted through conduit 306. When fluid pressure is applied to conduit 306 and conduit 296 is connected to exhaust as above described, piston 332 is forced downwardly and fluid from the chamber below piston 332 is exhausted via orifice 346, passages 297a and 297, bushing 331 and conduit 296. The speed of response of the pressure responsive device 298 may be adjusted by a needle valve 346.

From the foregoing detailed description, it is apparent that the present invention provides a new and improved device for rapidly and accurately forming side indented lock nuts from internally threaded nuts of polygonal cross section and which may be readily adapted to accommodate any size nut, and with slight modifications, to accommodate flanged and acorn nuts. The machine of the present invention may be utilized to effect any pressure penetrating operation and may in addition be used for assembling operations in which one article is to be inserted by a press fit into another without departing from the spirit of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for feeding nuts to and orienting them at a work station comprising a nut receiving station having a member formed with a vertically disposed through opening and a side opening normally intersecting said through opening, means for feeding a plurality of nuts seriatim through said side opening and into said through opening, said through opening being of such size as to receive only one nut at a time and being of such polygonal configuration as to establish a predetermined angular orientation of each nut therein, means at said receiving station for supporting each nut in said through opening, a fixedly mounted nut indexing fixture at said work station providing a downwardly opening recess having a cross-section corresponding to that of said through opening and being spaced vertically above and in alignment with said through opening, said recess being of such size as to receive only one nut at a time and being of such polygonal configuration as to retain the nut angular orientation established by said through opening, and means operable to supportingly engage the bottom surface of an angularly oriented nut in said through opening to vertically lift said nut through said through opening and into said recess, and means at said work station providing a piloting member coaxially disposed in said recess and adapted to extend into the bore of a nut lifted into said recess for accurately aligning the nut in said recess.

2. The device defined in claim 1 wherein said means supporting said nut in said through opening comprises an element having a horizontal nut support surface and a through opening coaxially aligning with said through opening, and wherein said means for lifting said nut comprises a reciprocal member slidable through the opening of said element and operable to support a nut lifted thereby in said indexing fixture for operation thereon by a tool.

3. The device defined in claim 2 comprising spring biased means permitting limited vertical movement of said piloting member relative to said indexing fixture, said indexing fixture having a plurality of side tool openings communicating with said recess.

4. A device for feeding nuts to and orienting them at a work station comprising a nut receiving station having a member formed with a side opening recess and a top opening intersecting said recess at substantially right angles, means for feeding a plurality of nuts seriatim laterally through said side opening recess to a position beneath said top opening, means in said recess for establishing a predetermined angular orientation of each nut relative to said top opening, means at said work station defining an immovably mounted nut orienting indexing fixture spaced vertically above said top opening and having a downwardly opening recess of polygonal cross section aligning with said top opening, means so engaging a nut in said receiving station as to support and lift one nut at a time through said top opening and into said fixture recess, and a pilot resiliently mounted on said fixture coaxial with and within said fixture recess to coact with the hole in each nut to properly axially align said nut relative to said fixture recess.

References Cited in the file of this patent
UNITED STATES PATENTS

| | | |
|---|---|---|
| 1,338,462 | Rydbeck | Apr. 27, 1920 |
| 2,141,280 | Selman | Dec. 27, 1938 |
| 2,859,459 | Stoll | Nov. 11, 1958 |

UNITED STATES PATENT OFFICE
CERTIFICATE OF CORRECTION

Patent No. 3,139,638                                           July 7, 1964

Gail C. Abbott

It is hereby certified that error appears in the above numbered patent requiring correction and that the said Letters Patent should read as corrected below.

Column 2, line 17, for "feding" read -- feeding --; column 3, line 35, for "being" read -- between --; column 4, line 33, for "nut 56" read -- recess 104 --; column 5, lines 23 to 26, strike out "188 passing through bolster plate 40 and the member 174 and fluid is introduced into cylinder 166 on the opposite side of piston 168 through a conduit".

Signed and sealed this 22nd day of December 1964.

(SEAL)
Attest:

ERNEST W. SWIDER                                     EDWARD J. BRENNER
Attesting Officer                                        Commissioner of Patents